United States Patent
Pazhyannur et al.

(10) Patent No.: US 6,198,735 B1
(45) Date of Patent: Mar. 6, 2001

(54) METHOD FOR RETRANSMITTING A DATA PACKET IN A PACKET NETWORK

(75) Inventors: Rajesh S. Pazhyannur, Palatine; Irfan Ali, Northbrook, both of IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/314,908

(22) Filed: May 20, 1999

(51) Int. Cl.[7] .................................................. H04J 3/24
(52) U.S. Cl. ........................ 370/349; 370/477; 714/748
(58) Field of Search ................................. 370/252, 349, 370/401, 402, 410, 394, 522, 524, 477, 521; 714/746, 747, 748, 749, 750; 375/240; 348/384; 709/246, 247

(56) References Cited

U.S. PATENT DOCUMENTS

| | | | |
|---|---|---|---|
| 5,535,199 | * 7/1996 | Amri et al. | 370/352 |
| 5,684,791 | * 11/1997 | Raychaudhuri et al. | 370/278 |
| 5,815,667 | * 9/1998 | Chien et al. | 370/229 |
| 5,850,526 | * 12/1998 | Chou | 395/200.77 |
| 5,987,022 | * 11/1999 | Geiger et al. | 370/349 |
| 6,052,812 | * 4/2000 | Chen et al. | 714/751 |

* cited by examiner

*Primary Examiner*—Ajit Patel
(74) *Attorney, Agent, or Firm*—Kenneth A. Haas

(57) ABSTRACT

The present invention provides a method for retransmitting a data packet in a packet network. Compressed data packets are sent from a first network entity to a second network entity. It is then determined if a compressed data packet has not been properly received at the second network entity. If the compressed data packet has not been properly received, the second network entity signals the first network entity to send an uncompressed version of the improperly received compressed data packet.

11 Claims, 2 Drawing Sheets

METHOD FOR RETRANSMITTING A DATA PACKET IN A PACKET NETWORK

RELATED APPLICATIONS

The following applications are related to this application and are filed on the date herewith. The disclosure of each of these related applications is incorporated by reference: Ser. No. 09/315,277, filed May 20, 1999 titled "METHOD FOR CHANGING COMMUNICATION IN A COMMUNICATION SYSTEM, AND COMMUNICATION SYSTEM THEREFOR"; Ser. No. 09/315,696, filed May 20, 1999, titled "METHOD FOR ESTABLISHING COMMUNICATION IN A PACKET NETWORK"; Ser. No. 09/315,309, filed May 20, 1999, titled "SESSION BASED BILLING IN A COMMUNICATION SYSTEM"; Ser. No. 09/315,314, filed May 20, 1999, titled "COMMUNICATION NETWORK METHOD AND APPARATUS"; Ser. No. 09/315,467, filed May 20, 1999, titled "METHOD AND SYSTEM FOR PROCESSING INTELLIGENT NETWORK COMMANDS IN A COMMUNICATIONS NETWORK"; Ser. No. 09/315,653, filed May 20, 1999, titled "METHOD AND SYSTEM FOR NETWORK SERVICE NEGOTIATION IN A TELECOMMUNICATIONS SYSTEM"; Ser. No. 09/315,465, filed May 20, 1999, titled "METHOD AND APPARATUS FOR ROUTING PACKET DATA IN A COMMUNICATIONS SYSTEM"; Ser. No. 09/315,466, filed May 20, 1999, titled "METHOD AND SYSTEM FOR INTRODUCING NEW SERVICES INTO A NETWORK".

FIELD OF THE INVENTION

The invention relates generally to communication systems, and more particularly to a method and communication system for retransmitting a data packet in a packet network.

BACKGROUND OF THE INVENTION

Current header compression is used on point-to-point (PPP) networks. Such compression reduces TCP/IP overhead from about 40 bytes to 4 bytes. In typical packet data networks, packets are often dropped at a selection distribution unit, due to the bottleneck provided on the over the air radio link. Dropped packets cause a lack of synchronization in the compression mechanism and lead to significant degradation of TCP throughput.

A common method of header compression is referred to as Van Jacobson header compression. Van Jacobson header compression works, in a general sense, based on delta-encoding between two end points in a PPP link. Each packet is sent with a sequence number. Rather than sending the sequence number in the header, the header includes a field that indicates the change in sequence number from the previous packet. This allows for compressed headers, due to the lessening of the data field required for the delta.

One problem associated with such a compression scheme is that if a packet gets dropped between end points in the PPP network, the delta information in the header relating to the sequence number is no longer valid. Successive packets are dropped because of a mismatch between the sequence number and the checksum. As a result, multiple packets are dropped, and the system does not right itself until the sender times out due to not receiving an acknowledgement from the receiver in time. Consequently, multiple packets are lost, and additional time is required to get the packet network re-synchronized.

Thus, a need exists for a method for retransmitting a data packet in a packet network which provides for increased reliability and fewer dropped packets.

DETAILED DESCRIPTION OF A PREFERRED EMBODIMENT

The present invention provides a method for retransmitting a data packet in a packet network. Compressed packets are sent in the network. When it is determined that a compressed packet has not been received properly, a network entity sends a message to the TCP sender, preferably a host PC, that the compressed message has not been received properly. This message is preferably three duplicate acknowledgement messages. Upon receiving this message, the TCP sender will transmit an uncompressed version of the improperly received packet, thereby increasing the accuracy and dependability of packet networks.

Figure 1:
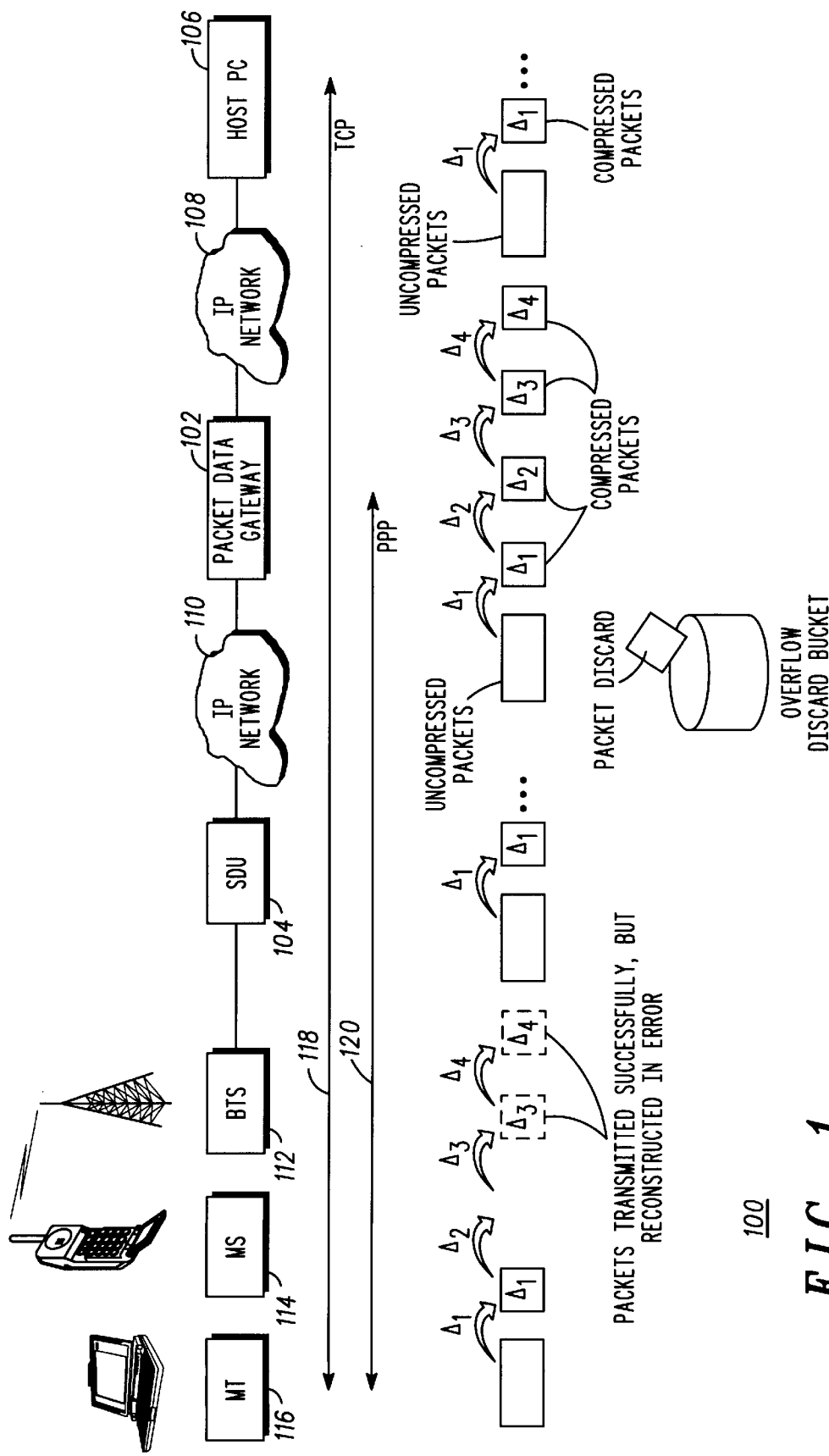
FIG. 1 depicts a communication system in accordance with the preferred embodiment of the present invention.
Figure 2:
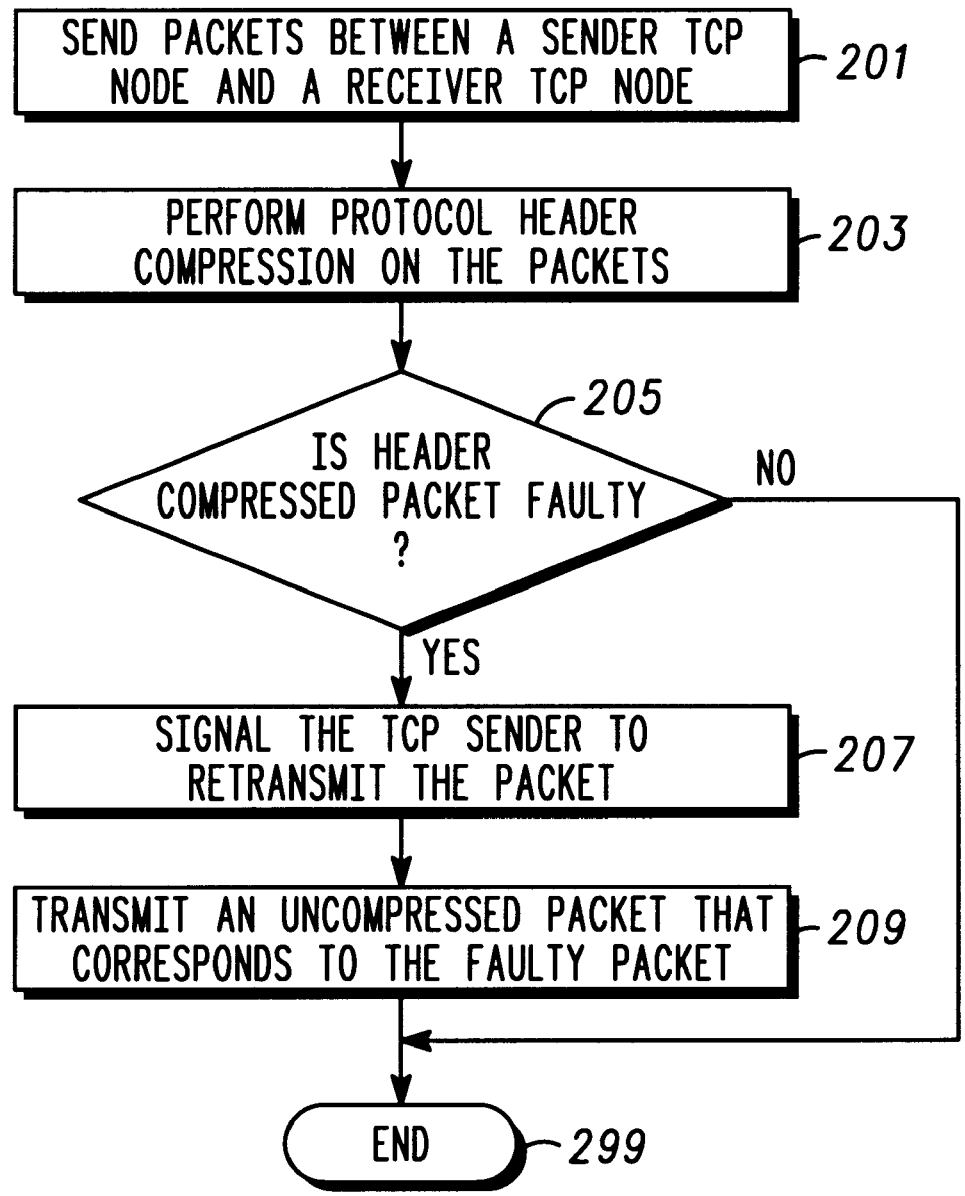
FIG. 2 depicts a flow chart for determining when to retransmit a data packet in a packet network in accordance with the preferred embodiment of the present invention.

The present invention can be better understood with reference to FIGS. 1 and 2. Referring now to FIG. 1, a communication system 100 is depicted in accordance with the preferred embodiment of the present invention. Communication system 100 is preferably a point-to-point packet network, such as a network that communicates via the Internet Protocol (IP). Communication system could alternately be any packet-based network that communicates via endpoints via a plurality of packets. Referring to FIG. 1, acronyms are used for convenience. The following is a list of the acronyms used in FIG. 1:

BTS Base Transceiver Station
IP Internet Protocol
MS Mobile Station
MT Mobile Terminal
PC Personal Computer
PDG Packet Data Gateway
SDU Selection Distribution Unit
TCP Transmission Control Protocol Communication system 100 includes a packet data gateway 102 that is capable of sending and receiving compressed data packets and uncompressed data packets. Communication system 100 also includes a selection distribution unit 104 coupled to packet data gateway 102. Selection distribution unit 104 is capable of receiving the compressed data packets and the uncompressed data packets from packet data gateway 102. Selection distribution unit 104 is capable of determining that a compressed data packet sent from the packet data gateway has been received in error. Selection distribution unit 104 also comprises the ability to alert packet data gateway 102 to send uncompressed data packets to selection distribution unit 104 that are copies of the lost compressed data packets.

Communication system 100 can also include a mobile terminal (MT) 116, a mobile station 114, and a base transceiver station 112. Communication system 100 can also include an IP network 110 located between selection distribution unit 104 and packet data gateway 102. Communication system 100 can also include an IP network 108 located between packet data gateway 102 and a host PC 106. Host PC 106 is where the TCP connection 118 is preferably terminated. TCP connection 118 is preferably between host PC and mobile terminal 116. Host PC 106 is preferably the TCP sender, preferably generating data packets to be sent to mobile terminal 116. Data packets generated by host PC 106 are preferably uncompressed data packets.

Packet data gateway 102 is preferably responsible for compressing headers for the link to mobile terminal 116. If a retransmitted packet from host PC 106 arrives, packet data gateway 102 will preferably send an uncompressed packet to mobile terminal 116.

Selection distribution unit 104 preferably generates three duplicate acknowledgements to host PC 106. Packet data gateway 102 in the uplink, mobile terminal 116 to host PC 106, forwards whatever packet it receives from selection distribution unit 104 to host PC 106. Host PC 106, on receiving three duplicate acknowledgements, retransmits in the downlink, host PC 106 to mobile terminal 116, a previously sent packet. The retransmitted packet is passed by packet data gateway 102 to selection distribution unit 104 as an uncompressed packet.

Mobile terminal 116 is preferably the TCP receiver.

FIG. 2 depicts a flow chart 200 for determining when to retransmit a data packet in a packet network, preferably an IP network, in accordance with the preferred embodiment of the present invention.

A sender TCP node sends (201) packets to a receiver TCP node, preferably using TCP. Packet data gateway 102 performs (203) protocol header compression on the packets. Such compression can be of the header of the packet, or of the payload of the packet, or both. In the preferred embodiment of the present invention, header compression is accomplished utilizing Van Jacobson header compression.

Packet data gateway 102 then determines (205) if any of the compressed packets are faulty. This is preferably done by checking a sequence number of the packet to determine if the packet received is the packet that should be received sequentially next. Compressed packets can be faulty due to be received in error, being out of order, dropped, or not being received at all. In an alternate embodiment of the present invention, the step of determining is done at an intermediate node located between the sender TCP node and the receiver TCP node.

If the compressed packet is faulty, the packet data gateway signals (207) the network entity to retransmit the packet. The network entity s preferably a TCP sender. This request will indicate to the sender that the sender should retransmit a copy of the packet that is uncompressed. In the preferred embodiment of the present invention, the packet data gateway signals the network entity by sending a plurality of acknowledgment messages from the second network entity to the first network entity. When the network entity receives the plurality of acknowledgment messages, the network entity is signaled that the packet indicated in the acknowledgement message was not properly received. The packet data gateway preferably send a plurality of duplicate acknowledgment messages to the network entity.

In the alternate embodiment of the present invention, the intermediate node signals to the TCP sender to retransmit the packet. This signaling is preferably accomplished by sending a plurality of duplicate acknowledgment messages from the intermediate node to the TCP sender node. This can alternately be accomplished by sending a plurality of duplicate acknowledgements messages from the selection distribution unit to the packet data gateway. In the alternate embodiment, the present invention can further comprise receiving the plurality of duplicate acknowledgements messages at the packet data gateway. The packet data gateway then determines a data packet to be retransmitted and transmits the data packet as an uncompressed data packet from the packet data gateway to the selection distribution unit. After retransmitting the data packet, the packet data gateway can send a plurality of compressed data packets.

The TCP sender then transmits (209) an uncompressed packet that corresponds to the faulty packet. This is preferably accomplished at the network entity by receiving the plurality of duplicate acknowledgements messages at the first network entity, and then determining which data packet is to be retransmitted. The network entity then transmits the data packet as an uncompressed data packet from the to the packet data gateway. In the preferred embodiment, after sending an uncompressed data packet, the network entity sends a plurality of compressed data packets.

The present invention therefore provides a method for retransmitting a data packet in a packet network. When a compressed packet is not received properly, a message is sent to alert the sender that the compressed packet has not been received properly. In the preferred embodiment, this message is a series of three duplicate acknowledgement messages. Upon receiving the three duplicate acknowledgement messages, the sender will resend an uncompressed version of the lost packet.

The present invention thereby provides an improved method for ensuring accurate transmission of messages. By sending multiple duplicate acknowledgement messages, a robust and reliable packet data network is provided without adding additional links or additional messages to existing packet data networks.

While this invention has been described in terms of certain examples thereof, it is not intended that it be limited to the above description, but rather only to the extent set forth in the claims that follow.

We claim:

1. A method for retransmitting a data packet in a packet network, the method comprising the steps of:

sending a plurality of compressed data packets from a first network entity to a second network entity;

determining that a compressed data packet has not been properly received at the second network entity; and signaling the first network entity to send an uncompressed version of the improperly received compressed data packet to the second network entity wherein the step of signaling the first network entity comprises the step of sending a plurality of acknowledgment messages from the second network entity to the first network wherein the acknowledgment messages comprises a plurality of duplicate acknowledgment messages.

2. A method for retransmitting a data packet in a packet network in accordance with claim 1, the method further comprising the steps of:

receiving the plurality of duplicate acknowledgements messages at the first network entity;

determining, at the first network entity, a data packet to be retransmitted; and transmitting the data packet as an uncompressed data packet from the first network entity to the second network entity.

3. A method for retransmitting a data packet in a packet network in accordance with claim 2, the method further comprising the step of, subsequent to transmitting the data packet as an uncompressed data packet, sending a plurality of compressed data packets from the first network entity.

4. A method for ensuring accurate transmission of compressed data packets in an Internet Protocol network, the method comprising the steps of:

communicating packets between a sender TCP node and a receiver TCP node using Transmission Control Protocol (TCP);

performing protocol header compression on the packets;

determining that a header compressed packet is faulty at an intermediate node;

signaling, when it is determined that the header compressed packet is faulty, from the intermediate node to the TCP sender to retransmit the packet, wherein the step of signaling comprises the step of sending a plurality of duplicate acknowledgment messages from the intermediate node to the TCP sender node; and transmitting an uncompressed packet that corresponds to the compressed packet that is faulty.

5. A method for ensuring accurate transmission of compressed data packets in accordance with claim 3, wherein the step of sending a plurality of acknowledgment messages comprises sending a plurality of duplicate acknowledgments messages from the selection distribution unit to the packet data gateway.

6. A method for ensuring accurate transmission of compressed data packets in accordance with claim 5, the method further comprising the steps of:

receiving the plurality of duplicate acknowledgements messages at the packet data gateway;

determining, at the packet data gateway, a data packet to be retransmitted; and transmitting the data packet as an uncompressed data packet from the packet data gateway to the selection distribution unit.

7. A method for ensuring accurate transmission of compressed data packets in accordance with claim 6, the method further comprising the step of, subsequent to transmitting the data packet as an uncompressed data packet, sending a plurality of compressed data packets from the packet data gateway.

8. A method for ensuring accurate transmission of compressed data packets in accordance with claim 4, wherein the step of performing protocol header compression comprises the step of performing Van Jacobson header compression.

9. A method for ensuring accurate transmission of compressed data packets in accordance with claim 4, wherein the step of determining that a header compressed packet is faulty comprises the step of determining that the header compressed packet has been dropped.

10. A method for ensuring accurate transmission of compressed data packets in accordance with claim 4, wherein the step of determining that a header compressed packet is faulty comprises the step of determining that the header compressed packet was received in error.

11. A packet network that is effective in ensuring accurate transmission of compressed data packets, the packet network comprising:

a packet data gateway that is capable of sending and receiving compressed data packets and uncompressed data packets; and a selection distribution unit coupled to the packet data gateway, the selection distribution unit capable of receiving the compressed data packets and the uncompressed data packets from the packet data gateway, the selection distribution unit capable of determining that a compressed data packet sent from the packet data gateway has been received in error, the selection distribution unit comprising the ability to alert the packet data gateway to send uncompressed data packets to the selection distribution unit that are copies of the lost compressed data packets.

* * * * *

UNITED STATES PATENT AND TRADEMARK OFFICE
CERTIFICATE OF CORRECTION

Page 1 of 1

PATENT NO. : 6,198,735 B1
DATED : March 6, 2001
INVENTOR(S) : Pazhyannur et al.

It is certified that error appears in the above-identified patent and that said Letters Patent is hereby corrected as shown below:

<u>Column 6,</u>
Line 15, delete entire Claim number 11.

Signed and Sealed this

Nineteenth Day of March, 2002

Attest:

JAMES E. ROGAN
*Director of the United States Patent and Trademark Office*

*Attesting Officer*